United States Patent
Kuemmel et al.

(10) Patent No.: US 11,891,092 B2
(45) Date of Patent: Feb. 6, 2024

(54) EMERGENCY MANEUVER CONTROL SYSTEM AND EMERGENCY MANEUVER CONTROL METHOD FOR A VEHICLE

(71) Applicant: Bayerische Motoren Werke Aktiengesellschaft, Munich (DE)

(72) Inventors: Martin Kuemmel, Fahrenzhausen (DE); Karl-Heinz Meitinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 159 days.

(21) Appl. No.: 17/428,351

(22) PCT Filed: Jan. 8, 2020

(86) PCT No.: PCT/EP2020/050265
§ 371 (c)(1),
(2) Date: Aug. 4, 2021

(87) PCT Pub. No.: WO2020/160860
PCT Pub. Date: Aug. 13, 2020

(65) Prior Publication Data
US 2022/0126880 A1    Apr. 28, 2022

(30) Foreign Application Priority Data

Feb. 5, 2019    (DE) ............... 10 2019 102 830.2

(51) Int. Cl.
*B60W 60/00*        (2020.01)
*B60W 10/20*        (2006.01)
(Continued)

(52) U.S. Cl.
CPC ...... *B60W 60/00186* (2020.02); *B60W 10/20* (2013.01); *B60W 30/143* (2013.01);
(Continued)

(58) Field of Classification Search
CPC ........... B60W 60/00186; B60W 10/20; B60W 30/143; B60W 40/06; B60W 40/105;
(Continued)

(56) References Cited

U.S. PATENT DOCUMENTS

| 5,555,503 A * | 9/1996 | Kyrtsos ................. G05D 1/028 701/518 |
| 2015/0012166 A1 * | 1/2015 | Hauler ................. G05D 1/0268 701/23 |

(Continued)

FOREIGN PATENT DOCUMENTS

| CN | 105555645 A | 5/2016 |
| DE | 10 2013 213 169 A1 | 1/2015 |

(Continued)

OTHER PUBLICATIONS

International Search Report (PCT/ISA/210) issued in PCT Application No. PCT/EP2020/050265 dated Apr. 2, 2020 with English translation (four (4) pages).

(Continued)

*Primary Examiner* — Jeff A Burke
*Assistant Examiner* — Kyle T Johnson
(74) *Attorney, Agent, or Firm* — Crowell & Moring LLP (57) ABSTRACT

An emergency maneuver control system includes a path planning control device, which is designed to determine an emergency maneuver trajectory in a highly automated or autonomous operating mode of the vehicle; a longitudinal guidance actuator control device which is coupled to the path planning control device and is designed to provide longitudinal guidance control commands derived from the emergency maneuver trajectory and, in the event of an emergency maneuver situation, to cause the at least one longitudinal guidance actuator to execute the longitudinal guidance control commands; and a transverse guidance (Continued)

actuator control device which is coupled to the path planning control device and is designed to provide transverse guidance control commands derived from the emergency maneuver trajectory and, in the event of an emergency maneuver situation, to cause the at least one transverse guidance actuator to execute the transverse guidance control commands.

17 Claims, 4 Drawing Sheets

(51) Int. Cl.
| | |
|---|---|
| *B60W 40/06* | (2012.01) |
| *B60W 40/105* | (2012.01) |
| *B60W 50/00* | (2006.01) |
| *B60W 50/029* | (2012.01) |
| *B60W 30/14* | (2006.01) |
| *B60W 40/13* | (2012.01) |

(52) U.S. Cl.
CPC .......... *B60W 40/06* (2013.01); *B60W 40/105* (2013.01); *B60W 40/13* (2013.01); *B60W 50/0097* (2013.01); *B60W 50/029* (2013.01); *B60W 2050/0292* (2013.01); *B60W 2540/18* (2013.01); *B60W 2552/15* (2020.02); *B60W 2552/30* (2020.02); *B60W 2552/40* (2020.02); *B60W 2710/207* (2013.01)

(58) Field of Classification Search
CPC ............. B60W 40/13; B60W 50/0097; B60W 50/029; B60W 2050/0292; B60W 2540/18; B60W 2552/15; B60W 2552/30; B60W 2552/40; B60W 2710/207; B60W 10/184; B60W 2050/0006; B60W 2710/182; B60W 2710/186; B60W 50/023; B60K 28/10
See application file for complete search history.

(56) References Cited

U.S. PATENT DOCUMENTS

| | | | |
|---|---|---|---|
| 2016/0159327 A1 | 6/2016 | Flehmig et al. | |
| 2016/0200317 A1* | 7/2016 | Danzl | B60W 10/04 701/25 |
| 2016/0368491 A1 | 12/2016 | Hauler et al. | |
| 2018/0229738 A1* | 8/2018 | Nilsson | B60W 50/0205 |
| 2019/0009797 A1* | 1/2019 | Liu | B60W 50/029 |
| 2019/0171205 A1* | 6/2019 | Kudanowski | B60W 10/04 |
| 2019/0258251 A1* | 8/2019 | Ditty | G06F 15/7807 |
| 2020/0051345 A1 | 2/2020 | Koller et al. | |
| 2021/0171062 A1* | 6/2021 | Hecker | B60T 8/885 |
| 2021/0316763 A1* | 10/2021 | Domahidi | G08G 1/096725 |
| 2022/0063622 A1* | 3/2022 | Jumpertz | G08G 1/22 |
| 2022/0126880 A1* | 4/2022 | Kuemmel | B60W 10/20 |

FOREIGN PATENT DOCUMENTS

| | | |
|---|---|---|
| DE | 10 2013 213 171 A1 | 1/2015 |
| DE | 10 2014 209 667 A1 | 12/2015 |
| DE | 10 2015 003 124 A1 | 9/2016 |
| DE | 10 2017 218 446 A1 | 5/2018 |

OTHER PUBLICATIONS

German-language Written Opinion (PCT/ISA/237) issued in PCT Application No. PCT/EP2020/050265 dated Apr. 2, 2020 (seven (7) pages).

German-language Search Report issued in German Application No. 10 2019 102 830.2 dated Dec. 12, 2019 with partial English translation (14 pages).

Chinese-language Office Action issued in Chinese Application No. 202080012305.8 dated Apr. 29, 2023 with English translation (19 pages).

* cited by examiner

EMERGENCY MANEUVER CONTROL SYSTEM AND EMERGENCY MANEUVER CONTROL METHOD FOR A VEHICLE

BACKGROUND AND SUMMARY OF THE INVENTION

The invention relates to an emergency maneuver control system and emergency maneuver control method for a vehicle.

From the prior art, various driver assistance systems are known which can perform certain driving tasks or control the vehicle autonomously. In order to ensure the necessary high availability of the highly automated driving functions, various concepts are known which make fail safety possible by way of one or more redundancy levels.

In the present document, a driver assistance system is to be understood to mean a system which, by implementation in software and/or hardware, is designed to, in a manner dependent on data ascertained by way of one or more sensors, intervene in the guidance of the vehicle or even permanently or at least temporarily take over full control.

If, in the event of a fault, it is not possible to continue to execute the respective driver assistance function, an emergency maneuver is generally initiated which brings the vehicle into a safe state.

One known concept for an emergency braking maneuver provides for example that, in the event of an emergency maneuver situation, a defined emergency maneuver trajectory is implemented by way of a control unit for longitudinal guidance. However, in the execution of such an emergency maneuver in which only the longitudinal guidance is controlled, there is the risk that the vehicle leaves the traffic lane laterally, in particular if the vehicle is presently situated at the beginning or end of a cornering maneuver.

The invention is based on the object of making available an emergency maneuver control system and an emergency maneuver control method for a vehicle which at least partially overcome the disadvantages in the prior art.

The object is achieved by the claimed invention.

A first aspect of the invention relates to an emergency maneuver control system for a vehicle, wherein the vehicle is operable at least in a driver-controlled operating mode and in a highly automated or autonomous operating mode and has at least one longitudinal guidance actuator and at least one lateral guidance actuator. Here, the emergency maneuver control system has:

a path planning control device which is designed to, in the highly automated or autonomous operating mode of the vehicle, ascertain an emergency maneuver trajectory;

a longitudinal guidance actuator control device which is coupled to the path planning control device and which is designed to make available longitudinal guidance control commands derived from the emergency maneuver trajectory and, in the event of an emergency maneuver situation, cause the at least one longitudinal guidance actuator to execute the longitudinal guidance control commands; and a lateral guidance actuator control device which is coupled to the path planning control device and which is designed to make available lateral guidance control commands derived from the emergency maneuver trajectory and, in the event of an emergency maneuver situation, cause the at least one lateral guidance actuator to execute the lateral guidance control commands.

A second aspect of the invention relates to an emergency maneuver control method for a vehicle, wherein the vehicle is operable at least in a driver-controlled operating mode and in a highly automated or autonomous operating mode and has at least one longitudinal guidance actuator and at least one lateral guidance actuator. Here, the emergency maneuver control method comprises:

ascertaining an emergency maneuver trajectory in the highly automated or autonomous operating mode of the vehicle;

deriving longitudinal guidance control commands and lateral guidance control commands from the ascertained emergency maneuver trajectory;

making available the longitudinal guidance control commands and lateral guidance control commands;

in the event of an emergency maneuver situation, outputting the longitudinal guidance control commands at least to the one longitudinal guidance actuator and outputting the lateral guidance control commands at least to the one lateral guidance actuator, and executing the longitudinal guidance control commands by way of at least the one longitudinal guidance actuator and executing the lateral guidance control commands by way of at least the one lateral guidance actuator.

In the context of the present document, a vehicle is to be understood to mean any type of vehicle by way of which persons and/or goods can be transported. Possible examples of these are: motor vehicles, heavy goods vehicles, land vehicles, buses, mobile cabins, cable car cabins, elevator cabins, rail vehicles, watercraft (for example ships, boats, submarines, diving bells, hovercrafts, hydrofoils), and aircraft (airplanes, helicopters, ground-effect vehicles, airships, balloons).

The vehicle is preferably a motor vehicle. In this context, a motor vehicle is a land vehicle which is moved by machine power without being bound to rails. In this context, a motor vehicle encompasses a motor car, a motorcycle and a truck tractor.

The vehicle, in particular the motor vehicle, is operable in a driver-controlled operating mode and in a highly automated or autonomous operating mode. In other words, a driver can themselves perform the driving task (driver-controlled operating mode), or the driving task is performed partially or entirely by a system (highly automated or autonomous operating mode), for example a driver assistance system.

If the highly automated or autonomous operating mode of the vehicle functions in a fault-free manner, this is controlled by way of a main channel. The main channel comprises a planning system, a sensor arrangement system and an execution system. In other words, the highly automated or autonomous driving functions are controlled and executed by way of the systems of the main channel.

If, for example, a system of the main channel fails or loses communication with another device, the highly automated or autonomous driving functions can be controlled and executed, in part to a limited degree, by way of one or more redundancy channels. Here, the one or more redundancy channels likewise comprise a planning system, a sensor arrangement system and an execution system.

A planning system of the main channel and/or of a redundancy channel may comprise the above-described path planning control device. An execution system of the main channel and/or of a redundancy channel may comprise the above-described longitudinal guidance actuator control device and/or the above-described lateral guidance actuator control device.

The expression "emergency maneuver" as used in the present document is not used to mean a maneuver such as is executed by emergency driver assistance functions, for example an emergency braking assistant or an emergency stop assistant. Such emergency driver assistance functions can be controlled and executed for example by the systems of the main channel and/or the systems of a redundancy channel. Such emergency driver assistance functions make use, in some cases, of a surroundings sensor arrangement that is present in the vehicle in order to initiate and/or carry out certain maneuvers (for example an emergency stop). In the context of the present document, an emergency maneuver thus differs significantly from an automated driving function.

In the present document, the expression "emergency maneuver" refers only to maneuvers that are necessitated by an emergency maneuver situation. An emergency maneuver situation is present for example if at least two of the following faults are present at the same time, such that both the main channel and one or more redundancy channels have failed:
  failure of a planning system of the main channel;
  failure of a planning system of a redundancy channel;
  failure of a sensor arrangement system of the main channel;
  failure of a sensor arrangement system of a redundancy channel;
  failure of an execution system of the main channel;
  failure of an execution system of a redundancy channel;
  failure of the communication capability of a planning system of the main channel;
  failure of the communication capability of a planning system of a redundancy channel;
  failure of the communication capability of an execution system of the main channel;
  failure of the communication capability of an execution system of a redundancy channel;
  failure of the power supply of the vehicle; and
  failure of a mechanical component of the vehicle.

In the context of the present document, the surroundings sensor arrangement is not used in the execution of an emergency maneuver. Specifically, depending on which faults trigger such an emergency maneuver, no sensor data whatsoever would be available, for example because the communication between sensors and control unit has broken down.

Thus, in the context of the present document, it is possible neither for the surroundings of the vehicle to be ascertained by a sensor, nor for a reaction to the surroundings to occur, in the execution of an emergency maneuver. Accordingly, during such an emergency maneuver, control commands are executed without use being made of a surroundings sensor arrangement in the process. A driver intervention is however possible at all times during the execution of an emergency maneuver.

An emergency maneuver is advantageously executed in order to bring the vehicle into a safe state. If, during highly automated or autonomous driving of the vehicle, at least two of the above-stated faults occur such that both the main channel and one or more redundancy channels fail, that is to say an emergency maneuver situation arises, then the time until the driver can themselves take over control of the vehicle is bridged by way of the emergency maneuver or the emergency maneuver trajectory. A typical takeover time of a driver is approximately 5 to 10 seconds. During this time, by way of the emergency maneuver control system and emergency maneuver control method described herein, the vehicle is brought into a safe state, proceeding from which the driver can safely take over the driving task.

The vehicle described herein is preferably a vehicle equipped with a system and/or with vehicle functions which make an automated driving mode possible. The expression "automated driving mode" is used to mean a partially automated driving mode, highly automated driving mode or fully automated or autonomous driving mode. Here, the automated driving modes correspond to the degrees of automation defined by the German Federal Highway Research Institute (BASt) (see the BASt publication "Forschung kompakt" ["Research compact"], edition 11/2012). In the case of partially automated driving (PAD), the system takes over the longitudinal guidance and lateral guidance for a certain time period and/or in specific situations, wherein the driver must permanently monitor the system. In the case of highly automated driving (HAD), the system takes over the longitudinal guidance and lateral guidance for a certain time period without the driver having to permanently monitor the system; the driver must however be capable of taking over the control of the vehicle within a certain time. In the case of fully automated driving (FAD), the system can, for a specific usage case, handle the driving task automatically in all situations; for this usage case, there is no longer a need for a driver. The above-stated degrees of automation according to the definition by the BASt correspond to the SAE levels 2 to 4 of the SAE J3016 standard (SAE—Society of Automotive Engineering). For example, highly automated driving (HAD) according to the BASt corresponds to level 3 of the SAE J3016 standard. Furthermore, in SAE J3016, the SAE level 5 is also provided as a highest degree of automation, which is not included in the definition by the BASt. The SAE level 5 corresponds to driverless driving, in the case of which the system can, during the entire journey, handle all situations automatically in the manner of a human driver; a driver is generally no longer necessary. In the present document, the degree of automation "fully automated" is intended to include the case of driverless driving.

The emergency maneuver control system may be arranged—at least partially—within or outside a vehicle. This thus means that there may also be embodiments of the emergency maneuver control system for a vehicle in the case of which parts of the emergency maneuver control system are arranged within the vehicle and/or parts of the emergency maneuver control system are arranged outside the vehicle. For example, the path planning control device and/or the longitudinal guidance actuator control device and/or the lateral guidance actuator control device may be arranged outside the vehicle, whereas the longitudinal guidance actuator and the lateral guidance actuator are arranged within the vehicle.

The path planning control device may be a vehicle-internal or vehicle-external device. The path planning control device is designed to plan the path that the vehicle is intended to travel along, from the start to the destination. Here, the area through which the path leads may be known or at least partially unknown. Furthermore, the path planning is advantageously performed such that no contact with obstructions occurs. The path planning control device may for example comprise a processing unit and optionally additionally a memory unit.

The path planning control device and/or the longitudinal guidance actuator control device and/or the lateral guidance actuator control device may be a device in a vehicle, for example an on-board computer, navigation unit, infotainment system etc. Alternatively, the path planning control device and/or the longitudinal guidance actuator control device and/or the lateral guidance actuator control device, or individual parts thereof, may be an external unit, for example a static unit (PC, cloud server) and/or a mobile terminal.

During the fault-free highly automated or autonomous operating mode of the vehicle, the path planning control unit ascertains an emergency maneuver trajectory. The expression "emergency maneuver trajectory" is used to mean a trajectory of an emergency maneuver. For example, an emergency braking maneuver trajectory may be an emergency maneuver trajectory. The emergency maneuver trajectory is thus ascertained continuously without an emergency maneuver situation being present. Only when an emergency maneuver situation ultimately arises is the emergency maneuver also executed. For this situation, however, an emergency maneuver trajectory is continuously ascertained in advance.

Longitudinal guidance control commands are derived from the emergency maneuver trajectory, and made available in the event that an emergency maneuver is to be carried out, by way of the longitudinal guidance actuator control device. In the event of an emergency maneuver situation, the longitudinal guidance actuator control device then causes the at least one longitudinal guidance actuator to execute the longitudinal guidance control commands.

The longitudinal guidance actuator is designed to receive and execute the longitudinal guidance control commands output by the longitudinal guidance actuator control device. In this way, the longitudinal guidance actuator is caused to execute the emergency maneuver trajectory. In other words, in the event of an emergency maneuver situation, the longitudinal guidance actuator executes the longitudinal-guidance-specific control commands in relation to the emergency maneuver trajectory.

Lateral guidance control commands are derived from the emergency maneuver trajectory, and made available in the event that an emergency maneuver is to be carried out, by way of the lateral guidance actuator control device. In the event of an emergency maneuver situation, the lateral guidance actuator control device then causes the at least one lateral guidance actuator to execute the lateral guidance control commands.

The lateral guidance actuator is designed to receive and execute the lateral guidance control commands output by the lateral guidance actuator control device. In this way, the lateral guidance actuator is caused to execute the emergency maneuver trajectory. In other words, in the event of an emergency maneuver situation, the lateral guidance actuator executes the lateral-guidance-specific control commands in relation to the emergency maneuver trajectory.

Both the longitudinal guidance actuator control device and the lateral guidance actuator control device are coupled to the path planning control device.

In the context of the present document, the coupling is used to mean a communicative connection. The communicative connection may be wireless (for example Bluetooth, WLAN, mobile radio) or wired (for example by way of a USB interface, data cable etc.).

In one embodiment, which may be combined with one or more of the embodiments described herein, the longitudinal guidance actuator control device is furthermore designed to, in the event of an emergency maneuver situation, cause the at least one longitudinal guidance actuator to execute the longitudinal guidance control commands independently of the lateral guidance control commands; the lateral guidance actuator control device is furthermore designed to, in the event of an emergency maneuver situation, cause the at least one lateral guidance actuator to execute the lateral guidance control commands independently of the longitudinal guidance control commands.

In other words, the longitudinal guidance actuator is caused to execute the longitudinal-guidance-specific control commands in relation to the emergency maneuver trajectory and, in so doing, give no consideration to the execution of the lateral-guidance-specific control commands in relation to the emergency maneuver trajectory by the lateral guidance actuator. Likewise, the lateral guidance actuator is caused to execute the lateral-guidance-specific control commands in relation to the emergency maneuver trajectory and, in so doing, give no consideration to the execution of the longitudinal-guidance-specific control commands in relation to the emergency maneuver trajectory by the longitudinal guidance actuator.

If the longitudinal guidance control commands are for example setpoint braking torques, then the longitudinal guidance actuator is caused to implement particular setpoint braking torques over a particular period of time, such as 15 seconds. Here, the longitudinal guidance actuator acts independently of the lateral guidance actuator. This thus means that the longitudinal guidance actuator, in executing a particular setpoint braking torque, does not wait for the parallel execution of a lateral-guidance-specific control command by the lateral guidance actuator. The execution of a particular longitudinal guidance control command is not dependent on the execution of a particular lateral guidance control command. Since the emergency maneuver trajectory comprises both longitudinal-guidance-specific and lateral-guidance-specific control commands, these control commands are processed by the respective control devices.

In one embodiment, which may be combined with one or more of the embodiments described herein, during the execution of the longitudinal guidance control commands and of the lateral guidance control commands, no communication occurs between the longitudinal guidance actuator control device and the lateral guidance actuator control device; alternatively or in addition, during the execution of the longitudinal guidance control commands and of the lateral guidance control commands, no communication occurs between the longitudinal guidance actuator and the lateral guidance actuator.

Communication between the longitudinal guidance actuator control device and the lateral guidance actuator control device, or communication between the longitudinal guidance actuator and the lateral guidance actuator, in order to realize mutual coordination of the longitudinal guidance control commands and lateral guidance control commands, is thus not necessary. In other words, the longitudinal guidance actuator control device and the lateral guidance actuator control device process the respective control commands in parallel.

In one embodiment, which may be combined with one or more of the embodiments described herein, the emergency maneuver trajectory is ascertained in a manner dependent on the respective present and/or future driving situation of the vehicle.

The present and/or future driving situation of the vehicle may be determined by operating parameters of the vehicle and/or by surroundings parameters of the vehicle. Operating parameters of the vehicle are for example the speed of the vehicle, the vehicle mass or the condition (fault-free/partially defective/fully defective) of vehicle components. Surroundings parameters of the vehicle are for example the condition of the roadway, the curvature of the roadway or the topography of the route to be driven.

The emergency maneuver trajectory is preferably ascertained continuously in a manner dependent on the respective present and/or future driving situation of the vehicle. In other words, the emergency maneuver trajectory is ascertained or updated at predetermined time intervals. These predetermined time intervals may be 1 ms to 30 s, preferably 1 to 100 ms, more preferably 1 to 60 ms.

In the fault-free highly automated or autonomous operating mode of the vehicle, the emergency maneuver trajectory is thus ascertained or updated continuously and then, in the event of an emergency maneuver, that is to say at the beginning of the emergency maneuver, the continuously updated longitudinal guidance control commands and lateral guidance control commands are used for causing the at least one longitudinal guidance actuator and the at least one lateral guidance actuator to execute the most recently updated longitudinal guidance control commands and lateral guidance control commands respectively.

In other words, longitudinal guidance control commands and lateral guidance control commands are constantly updated in the fault-free operating mode and, at the beginning of the emergency maneuver, said commands are frozen and subsequently executed. This thus means that, in the event of an emergency maneuver situation, the most recently updated emergency maneuver trajectory is traveled along in a manner controlled by the longitudinal guidance actuator control device and the longitudinal guidance actuator and by way of the lateral guidance actuator control device and the lateral guidance actuator.

By way of the controlled and coordinated emergency maneuver, the likelihood is increased that, in an emergency maneuver situation, for example in the event of a communication failure which results in both a failure of the main channel and a failure of one or more redundancy channels, the vehicle does not leave the traffic lane during the highly automated driving operation.

In one embodiment, which may be combined with one or more of the embodiments described herein, the present and/or future driving situation of the vehicle is defined by at least one longitudinal guidance parameter and/or at least one lateral guidance parameter.

Here, the at least one longitudinal guidance parameter is advantageously selected from the following:
  present and/or future friction coefficient of the roadway;
  present and/or future ascending gradient of the roadway;
  present and/or future descending gradient of the roadway;
  present vehicle mass;
  present and/or future longitudinal speed of the vehicle; in particular, the present longitudinal speed is ascertained by way of a longitudinal sensor unit;
  present and/or future change in longitudinal speed of the vehicle; in particular, the present change in longitudinal speed is ascertained by means of a longitudinal sensor unit.

The present and/or future longitudinal speed or change in longitudinal speed of the vehicle may be made available to the longitudinal guidance actuator control device by a vehicle component and/or a vehicle function, such as an autonomous cruise control function.

Alternatively, the present and/or future longitudinal speed or change in longitudinal speed of the vehicle is ascertained by way of a longitudinal sensor unit.

It is advantageously the case that the emergency maneuver control system has the longitudinal sensor unit. The longitudinal sensor unit is advantageously arranged on or integrated into the lateral guidance actuator control device. Alternatively, the longitudinal sensor unit is arranged on or integrated into the longitudinal guidance actuator control device. As a result of the integration of the longitudinal sensor unit either in the lateral guidance actuator control device or the longitudinal guidance actuator control device, the existing sensor arrangement can be utilized, and no additional components are required. The data of the longitudinal sensor unit can be made available on a bus system.

The longitudinal sensor unit may comprise a longitudinal acceleration sensor. Additionally, the longitudinal sensor unit may comprise a processing unit which is designed to store and/or process and/or output the ascertained sensor data.

Alternatively, the longitudinal sensor unit may be not arranged on the lateral guidance actuator control device or the longitudinal guidance actuator control device but coupled to the lateral guidance actuator control device or the longitudinal guidance actuator control device.

Alternatively or in addition, at least one of the lateral guidance parameters is selected from the following:
  present and/or future curvature of a traffic lane of a driving route of the vehicle;
  present and/or future change in a curvature of a traffic lane of a driving route of the vehicle;
  present and/or future side forces acting on the vehicle; and
  present and/or future lateral acceleration of the vehicle; the present lateral acceleration is ascertained in particular by way of a lateral sensor unit;
  present and/or future change in lateral acceleration of the vehicle; the present change in lateral acceleration is ascertained in particular by way of a lateral sensor unit;
  present and/or future steering angle of the vehicle;
  present and/or future change in a steering angle of the vehicle.

The present and/or future lateral acceleration of the vehicle may be made available to the lateral guidance actuator control device by a vehicle component and/or a vehicle function, such as a lane keeping assistant function.

Alternatively, the present and/or future lateral acceleration of the vehicle is ascertained by way of a lateral sensor unit.

It is advantageously the case that the emergency maneuver control system has the lateral sensor unit. The lateral sensor unit is advantageously arranged on or integrated into the longitudinal guidance actuator control device. Alternatively, the lateral sensor unit is arranged on or integrated into the lateral guidance actuator control device. As a result of the integration of the lateral sensor unit either in the lateral guidance actuator control device or the longitudinal guidance actuator control device, the existing sensor arrangement can be utilized, and no additional components are required. The data of the lateral sensor unit can be made available on a bus system.

The lateral sensor unit may comprise a lateral acceleration sensor. Additionally, the lateral sensor unit may comprise a processing unit which is designed to store and/or process and/or output the ascertained sensor data.

Alternatively, the lateral sensor unit may be not arranged on the lateral guidance actuator control device or the longitudinal guidance actuator control device but coupled to the lateral guidance actuator control device or the longitudinal guidance actuator control device.

In one embodiment, which may be combined with one or more of the embodiments described herein, the longitudinal guidance control commands comprise at least one setpoint longitudinal guidance parameter, in particular as a function of a profile with respect to time; the lateral guidance control commands comprise at least one setpoint lateral guidance parameter, in particular as a function of a profile with respect to time. The at least one setpoint longitudinal guidance parameter preferably comprises at least one setpoint braking torque. The at least one setpoint lateral guidance parameter preferably comprises at least one setpoint steering angle.

In other words, particular setpoint longitudinal guidance parameters are executed at a particular point in time and may differ at the particular points in time. For example, a setpoint braking torque at a first point in time is lower than the setpoint braking torque at a later point in time.

For example, the longitudinal guidance control commands may be a series of setpoint longitudinal guidance parameters as a function of a profile with respect to time (for example a setpoint braking torque that changes over a particular period of time) and the lateral guidance control commands may be a single setpoint lateral guidance parameter (for example a setpoint steering angle). In other words, it is for example the case that a single value is provided for the setpoint lateral guidance parameter, which is then, in the event of an emergency maneuver situation, handed over to the at least one lateral guidance actuator for execution. For example, a particular setpoint steering angle is determined which is then executed by way of the lateral guidance actuator in the event of an emergency maneuver situation.

In one embodiment, which may be combined with one or more of the embodiments described herein, the path planning control device and/or the longitudinal guidance actuator control device are furthermore designed to ascertain an emergency maneuver target speed and/or a maximum emergency maneuver duration of the emergency maneuver trajectory. The longitudinal guidance actuator control device is furthermore designed to, in the event of an emergency maneuver situation, cause the at least one longitudinal guidance actuator to execute the longitudinal guidance control commands until such time as the present speed of the vehicle is lower than or equal to the emergency maneuver target speed or until such time as the duration of the emergency maneuver has reached the maximum emergency maneuver duration.

The path planning control device and the longitudinal guidance actuator control device may be formed as one control unit.

If the emergency maneuver target speed and/or the maximum emergency maneuver duration have been reached, the emergency maneuver is ended.

The longitudinal guidance actuator control device is advantageously furthermore designed to configure longitudinal guidance control commands derived from the emergency maneuver trajectory such that a predetermined braking pattern can be executed. A predetermined braking pattern means a specified sequence of particular braking torques or particular brake pressures. In particular, the predetermined braking pattern means a specified sequence of particular braking torques or particular brake pressures for a particular period of time.

In other words, the braking pattern is specified and is not varied, for example readjusted, during the execution of the longitudinal guidance control commands. This thus means that the braking pattern is independent of the present vehicle reaction (for example acceleration). In this way, feedback that could lead to an opposing action of the system counter to a possible driver intervention is avoided.

For example, the braking pattern may provide a constant brake pressure and/or a constant braking torque for a particular period of time.

Alternatively or in addition, the braking pattern may be selected so as to result in a so-called stutter effect. The stutter effect is achieved for example by virtue of particular braking moments or particular brake pressures being implemented repeatedly for a short period of time.

The longitudinal guidance actuator control device is advantageously furthermore designed to receive the predetermined braking pattern from a brake system of the vehicle. The predetermined braking pattern is advantageously ascertained in a manner dependent on the respective present and/or future driving situation of the vehicle.

The longitudinal guidance actuator control device then makes available the corresponding longitudinal guidance control commands in a manner dependent on the predetermined braking pattern. In other words, the longitudinal guidance control commands are both derived from the emergency maneuver trajectory and configured in a manner dependent on the predetermined braking pattern. The longitudinal guidance control commands can subsequently, in the event of an emergency maneuver situation, be transmitted to the at least one longitudinal guidance actuator for execution.

The emergency maneuver is ended when a predetermined emergency maneuver target speed is reached or undershot or when a maximum emergency maneuver duration is reached or overshot.

This has the advantage that a cancelling-out of a driver-induced acceleration by the braking operation is avoided, even if communication between the brake system and the other control units of the vehicle is not possible. In the event of a fault that leads to an emergency maneuver, it may for example be the case that the executing vehicle system cannot communicate, or can communicate only to a limited degree, with other systems, for example a sensor system, for example because the bus system of the vehicle has failed. During such an emergency maneuver, it would then not be possible to identify a takeover by a driver. If the driver takes over for example during an autonomous emergency braking operation carried out by the brake system of the vehicle, by virtue of said driver actuating the accelerator pedal on the basis of an acceleration demand, the driver action cannot be detected during the emergency maneuver owing to the fault. In this case, the brake system would continue to carry out the autonomous emergency braking operation, counter to the acceleration demand of the driver. If the vehicle is braked to a standstill counter to the demand of the driver, the following traffic may give rise to a hazardous situation. By contrast, if the emergency maneuver is limited by an emergency maneuver target speed or a maximum emergency maneuver duration being reached, the driver can take over control of the vehicle again already before the vehicle reaches an absolute standstill, whereby hazardous situations can be avoided.

In one embodiment, which may be combined with one or more of the embodiments described herein, the emergency maneuver target speed and/or the maximum emergency maneuver duration are ascertained in a manner dependent on the respective present and/or future driving situation of the vehicle.

In one embodiment, which may be combined with one or more of the embodiments described herein, the present and/or future driving situation of the vehicle is defined by at least one longitudinal guidance parameter and/or at least one lateral guidance parameter.

For the description of the present and/or future driving situation of the vehicle and of the at least one longitudinal guidance parameter and/or of the at least one transverse guidance parameter, reference is made to the statements further above.

The emergency maneuver target speed and/or the maximum emergency maneuver duration are preferably continuously ascertained in a manner dependent on the respective present and/or future driving situation of the vehicle. In other words, the emergency maneuver target speed and/or the maximum emergency maneuver duration are ascertained or updated at predetermined time intervals. These predetermined time intervals may be 1 ms to 30 s, preferably 1 to 100 ms, more preferably 1 to 60 ms.

In the fault-free highly automated or autonomous operating mode of the vehicle, the emergency maneuver target speed and/or the maximum emergency maneuver duration are thus ascertained or updated continuously and then, in the event of an emergency maneuver, that is to say at the beginning of the emergency maneuver, the most recently updated emergency maneuver target speed and/or the maximum emergency maneuver duration are used for causing the at least one longitudinal guidance actuator to execute the longitudinal guidance control commands.

In other words, the emergency maneuver target speed and/or the maximum emergency maneuver duration are constantly updated in the fault-free highly automated or autonomous operating mode of the vehicle and, at the beginning of the emergency maneuver, are frozen and subsequently correspondingly executed.

The emergency maneuver target speed and/or the maximum emergency maneuver duration are ascertained by the path planning control device. Here, the ascertainment of the emergency maneuver target speed and/or of the maximum emergency maneuver duration includes the possibility that the emergency maneuver target speed and/or the maximum emergency maneuver duration are calculated by another device, for example by the longitudinal guidance actuator control device, and transmitted to the path planning control device.

In one embodiment, which may be combined with one or more of the embodiments described herein, the emergency maneuver target speed and/or the maximum emergency maneuver duration are calculated by a brake system of the vehicle and transmitted to the path planning control device. Preferably, the emergency maneuver target speed and/or the maximum emergency maneuver duration are calculated and/or stored in the longitudinal guidance actuator control device and/or in the brake system of the vehicle at the beginning of the emergency maneuver. The maximum maneuver duration is stored in the brake system at the beginning of the respective emergency maneuver. Said maximum maneuver duration is preferably calculated at the beginning of the emergency maneuver.

In one advantageous example, the maximum emergency maneuver duration is calculated by virtue of the braking maneuver duration required to brake a vehicle to the emergency maneuver target speed with a given brake pressure or braking torque under standardized conditions being multiplied by a factor of between 1.0 and 3.0, preferably between 1.2 and 3.0. Standardized conditions are to be understood to mean standardized parameters, such as for example a flat roadway, medium loading of the vehicle, normal brake parameters etc.

In one embodiment, which may be combined with one or more of the embodiments described herein, the present speed of the vehicle is ascertained by way of a sensor system and transmitted to the longitudinal guidance actuator control device. The longitudinal guidance actuator control device is furthermore designed to, in the event that the present speed of the vehicle can be ascertained, in the event of an emergency maneuver situation, cause the at least one longitudinal guidance actuator to execute the longitudinal guidance control commands until such time as the present speed of the vehicle is lower than or equal to the emergency maneuver target speed; and in the event that the present speed of the vehicle cannot be ascertained, in the event of an emergency maneuver situation, cause the at least one longitudinal guidance actuator to execute the longitudinal guidance control commands until such time as the duration of the emergency maneuver reaches the maximum emergency maneuver duration.

The sensor system is advantageously the longitudinal sensor unit described further above. Alternatively, the sensor system may be a further device of the emergency maneuver control system or of the vehicle.

If an emergency maneuver is limited by an emergency maneuver target speed and/or a maximum emergency maneuver duration, the vehicle can be braked with sufficient accuracy. At the same time, it is however ensured that the driver can themselves intervene in the emergency maneuver, for example by way of the accelerator pedal. This is the case even if communication is no longer possible between brake system and accelerator pedal. In this way, a minimization of risk is made possible with regard to the conflicting aims of "general hazard reduction", "controllability", "controllability by the following traffic" and "controllability by the driver".

As discussed above, the highly automated or autonomous operating mode of the vehicle is controlled by way of a main channel. The main channel comprises a planning system, a sensor arrangement system and an execution system. In the event of a failure of the main channel, the highly automated or autonomous operating mode of the vehicle is controlled by way of at least one redundancy channel which comprises a planning system, a sensor arrangement system and an execution system. In the event of a failure of the main channel, the one or the multiple redundancy channels are placed into a waiting condition for a predetermined waiting duration. During the predetermined waiting duration, a switch from the main channel to the one or the multiple redundancy channels is attempted. If the predetermined waiting duration has expired and a switch from the main channel to the one or the multiple redundancy channels has not occurred, the longitudinal guidance control commands are executed by way of at least the one longitudinal guidance actuator and the lateral guidance control commands are executed by way of at least the one lateral guidance actuator. A failure of the main channel is present for example if at least one system of the main channel (for example a planning system, a sensor arrangement system and/or an execution system) fails or the communication of said system of the main channel with another device fails.

The event of an emergency maneuver situation is present when both the main channel and one or more redundancy channels have failed.

It is advantageously the case that an emergency maneuver target speed and/or a maximum emergency maneuver duration of the emergency maneuver trajectory is ascertained at least in the highly automated or autonomous operating mode of the vehicle. If the predetermined waiting duration expires, and if a switch from the main channel to the one or the multiple redundancy channels has not occurred, the emergency maneuver is executed by virtue of the longitudinal guidance control commands being executed by way of the at least one longitudinal guidance actuator until such time as the duration of the emergency maneuver has reached the maximum emergency maneuver duration and/or until such time as the present speed of the vehicle is lower than or equal to the emergency maneuver target speed.

Problems arise if, after an initial fault in the main channel, the switch to a redundancy channel does not occur, for example owing to a consequential fault or a second fault in the switching logic or a failure of the redundancy channel that is to be activated. It is then not possible for the highly automated or autonomous operating mode to be continued. In this case, without steering and brake actuation, the vehicle would continue to roll with undiminished speed, without the driver even being able to take over the vehicle guidance. An accident in this situation would result in extremely severe consequences for the occupants and the surrounding traffic.

In other words, the channel switching (switching from main channel to redundancy channel) is configured such that, in the event of failure of the main channel, the failed main channel and/or the at least one redundancy channel that has not yet been activated assume a special state "await successful switch to the redundancy channel" and, in this state, await a successful channel switching operation.

If the switch to the at least one redundancy channel then does not occur within a predefined period of time (within the predetermined waiting duration), it is to be assumed that a severe fault is present. In this case, an emergency maneuver is then initiated which makes it easier for the driver to take over the guidance of the vehicle and minimizes the severity of damage in the event of an accident.

The emergency maneuver may however also be initiated in one redundancy channel or multiple redundancy channels and also outside the main channel. The emergency maneuver may comprise an activation of parking brake actuators and/or pre-crash measures (for example adaptation of the seat position, the window closing position, etc.) and/or a warning to the surrounding traffic, for example by way of hazard warning flashers.

As a result of the initiation of an emergency maneuver if a successful channel switching operation has not occurred after a predefined period of time, the uncontrolled vehicle state after an initial fault without successful switching to a redundancy channel can be avoided. Thus, the accident and injury risk for the vehicle occupants and the surrounding traffic is considerably reduced. As a result of a reduction in speed of the vehicle, there is the resulting advantage in this situation that a driver is given more time to orient themselves and take over the guidance of the vehicle.

The above statements relating to the emergency maneuver control system according to the invention for a vehicle according to the first aspect of the invention correspondingly also apply to the emergency maneuver control method for a vehicle according to the second aspect of the invention and vice versa; advantageous exemplary embodiments of the method according to the invention correspond to the described advantageous exemplary embodiments of the system according to the invention. Advantageous exemplary embodiments of the method according to the invention that are not explicitly described at this juncture correspond to the described advantageous exemplary embodiments of the system according to the invention.

Further advantages, features and details of the invention will emerge from the following description of a preferred exemplary embodiment and on the basis of the drawing. The features and feature combinations mentioned above in the description, and the features and feature combinations mentioned below in the description of the figures and/or shown only in the figures, may be used not only in the respectively specified combination but also in other combinations or individually without departing from the scope of the invention.

The invention will be described below on the basis of exemplary embodiments with the aid of the appended drawings.

DETAILED DESCRIPTION OF THE DRAWINGS

Figure 1:
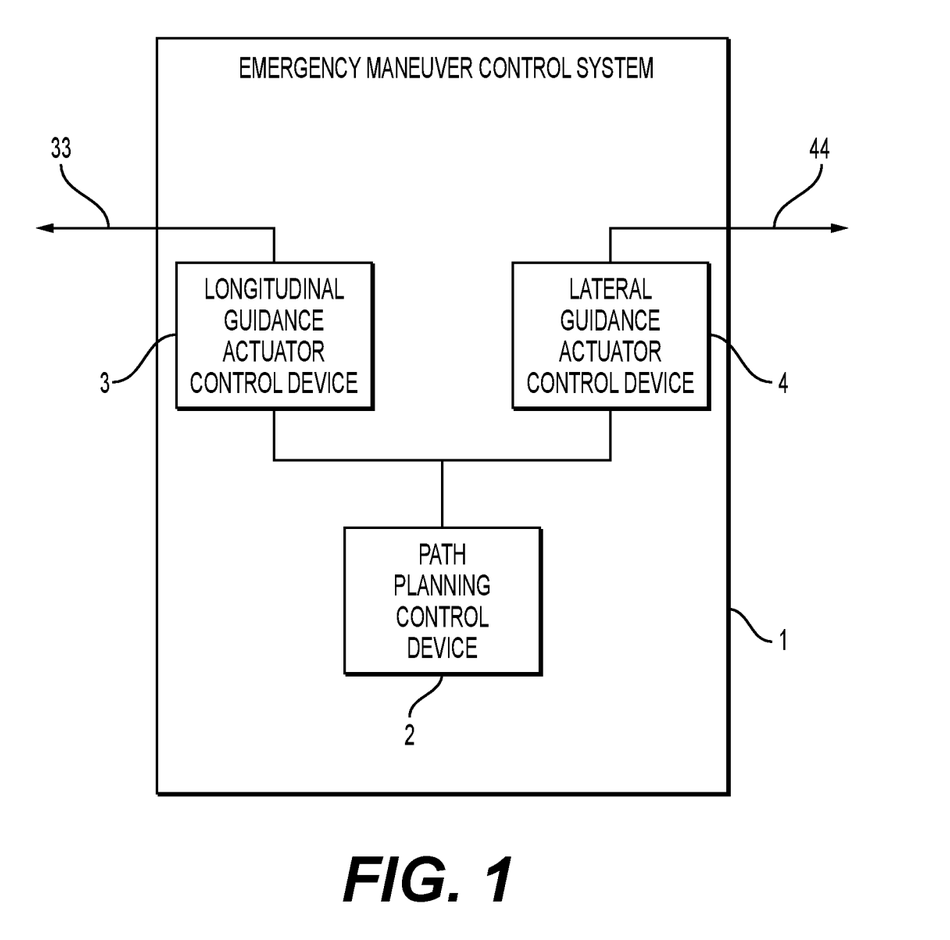
FIG. 1 schematically shows an emergency maneuver control system for a vehicle according to an embodiment.

FIG. 1 schematically shows an emergency maneuver control system 1 for a vehicle. The emergency maneuver control system 1 has a path planning control device 2, a longitudinal guidance actuator control device 3 and a lateral guidance actuator control device 4. The path planning control device 2 continuously calculates an emergency maneuver trajectory NT for the vehicle. Here, the emergency maneuver trajectory NT describes the trajectory of a particular emergency maneuver. Below, an emergency braking operation will be discussed as an example for an emergency maneuver. However, the emergency maneuver control system described in the present document, and the described emergency maneuver control method, are not intended to be restricted to an emergency braking operation. Setpoint braking torques 33 are derived by way of the longitudinal guidance actuator control device 3, and setpoint steering angles 44 are derived by way of the lateral guidance actuator control device 4, from the emergency braking operation trajectory NT. The emergency braking operation trajectory NT and the setpoint braking torques 33 and the setpoint steering angles 44 are in this case ascertained continuously during highly automated or autonomous driving of the vehicle. The derived control commands (setpoint braking torques 33 and setpoint steering angles 44) are made available by the control devices 3 and 4 for further processing.

Figure 2:
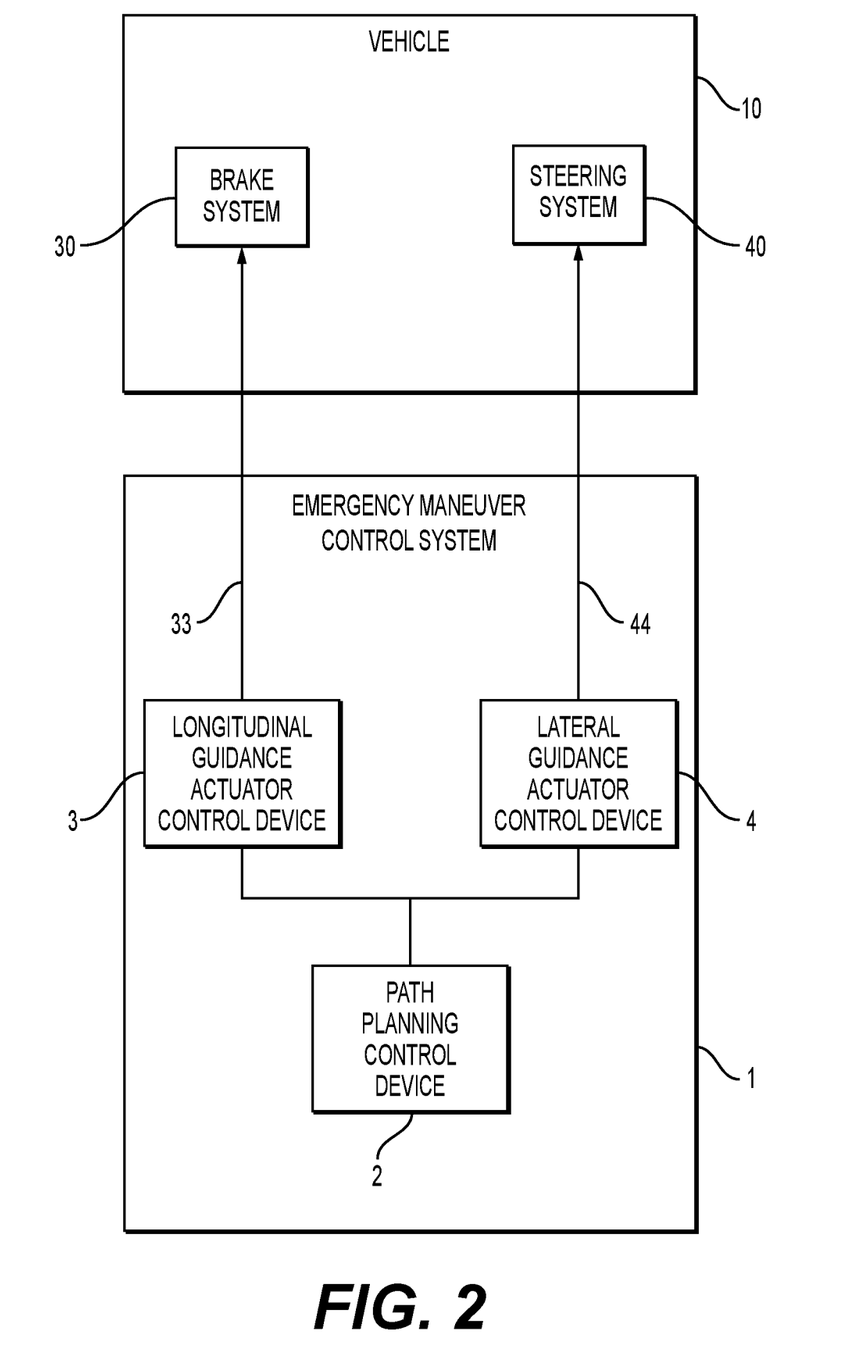
FIG. 2 schematically shows an emergency maneuver control system for a vehicle according to an embodiment.

In the event of an emergency maneuver situation, the longitudinal guidance actuator control device 3 causes a brake system 30 of the vehicle 10, and the lateral guidance actuator control device 4 causes a steering system 40 of the vehicle 10, to carry out the emergency braking operation. This situation is illustrated in FIG. 2. For this purpose, the longitudinal guidance actuator control device 3 causes the brake system 30 to implement the setpoint braking torques 33. The lateral guidance actuator control device 4 causes the steering system 40 to implement the setpoint steering angles 44.

Figure 3:
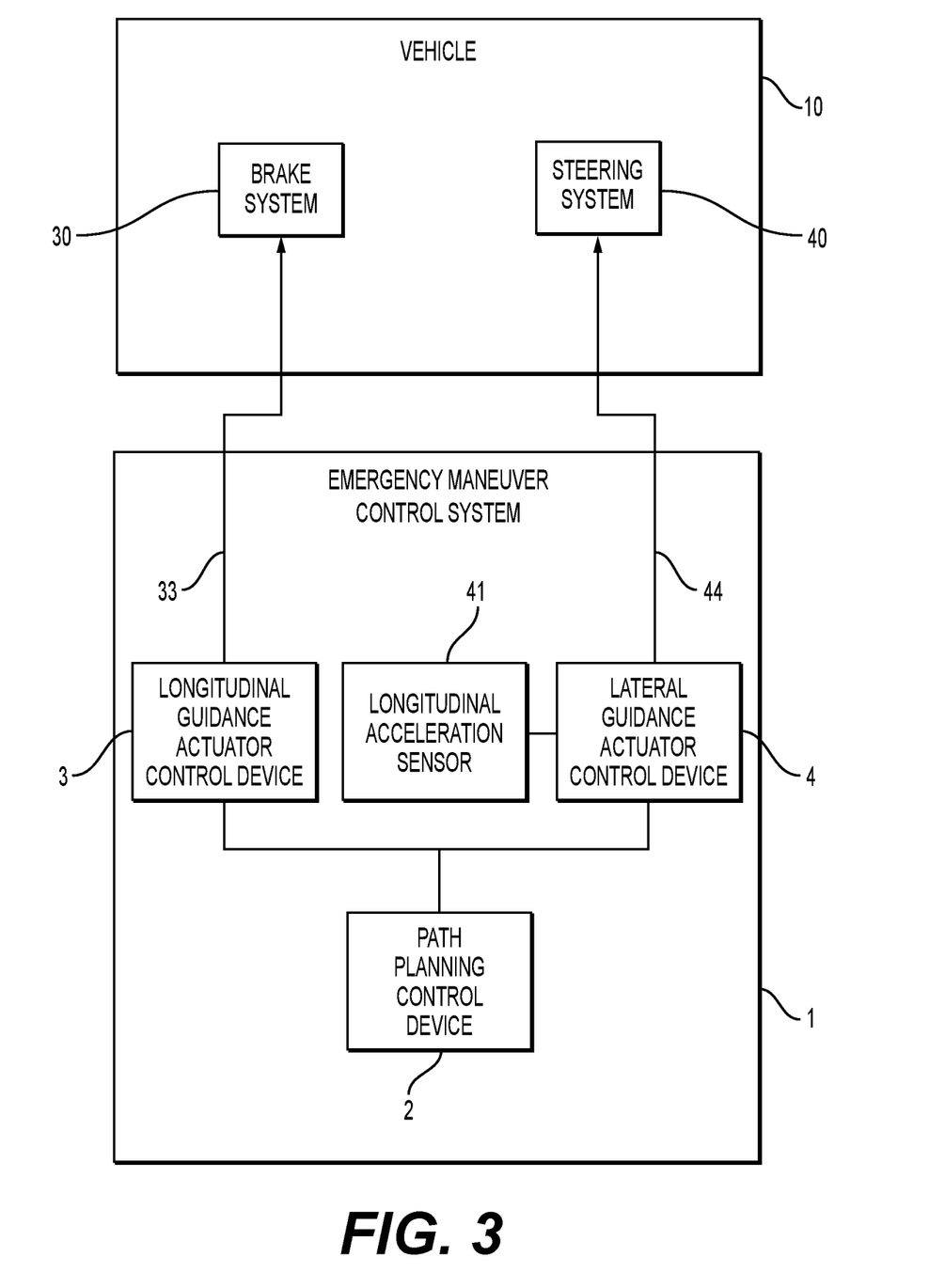
FIG. 3 schematically shows an emergency maneuver control system for a vehicle according to an embodiment.

FIG. 3 shows an example for an emergency maneuver control system 1 for a vehicle 10, in the case of which a longitudinal acceleration sensor 41 is arranged on the lateral guidance actuator control device 4. The present speed of the vehicle 10 is continuously ascertained by way of the longitudinal acceleration sensor 41. For the event of an emergency maneuver situation, the setpoint steering angles 44 can be adapted through the continuous ascertainment of the speed of the vehicle. For example, if an emergency braking operation is initiated at the beginning of a corner, then the speed of the vehicle 10 is reduced owing to the setpoint braking torques 33 that are implemented or to be implemented. A slower turn-in is required in the case of a decelerating vehicle than in the case of a non-decelerating vehicle. Therefore, in the case of the deceleration of the vehicle being realized by way of the brake system, a slower turn-in is simultaneously realized by way of the steering system. The setpoint steering angles 44 are thus adapted to the setpoint braking torques 33 in relation to the route, in this case a corner.

If an emergency maneuver situation were to arise as a result of a failure of the brake system 30 of the vehicle 10 in addition to a fault that has already occurred, it would not be possible for the setpoint braking torques 33 to be implemented by way of the brake system 30. This would have the result that the vehicle 10 continues to move with a virtually unchanged speed. If, in this case, the setpoint steering angles 44 were implemented as described above, the slower turn-in would lead to a departure from the lane in the direction of the outside of the corner. By way of the longitudinal acceleration sensor 41, however, it is possible to measure a lower deceleration of the vehicle 10 and adapt the setpoint steering angle 44 correspondingly. The likelihood of the vehicle 10 remaining in the lane is thus increased. Thus, by way of the controlled and coordinated emergency maneuver corrected by way of the longitudinal acceleration, the likelihood is increased that the driving lane is not departed from in the event of an emergency maneuver situation during highly automated driving.

Figure 4:
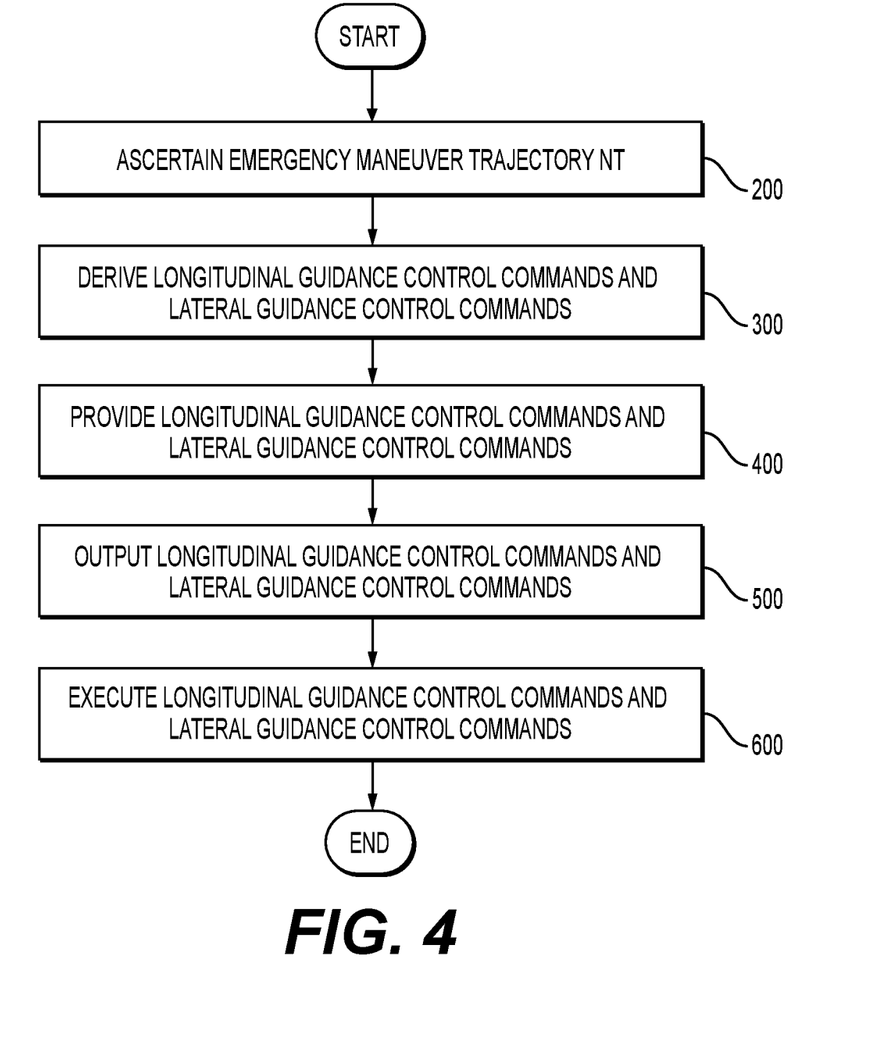
FIG. 4 schematically shows an emergency maneuver control method for a vehicle according to an embodiment.

FIG. 4 schematically shows an emergency maneuver control method for a vehicle 10. In this method, firstly, an emergency maneuver trajectory NT is ascertained during the highly automated or autonomous operating mode of the vehicle 10. In FIG. 4, this is denoted by the reference designation 200. The reference designation 300 denotes the deriving of longitudinal guidance control commands 33 and lateral guidance control commands 44 from the ascertained emergency maneuver trajectory NT. The provision of the longitudinal guidance control commands 33 and of the lateral guidance control commands 44 is denoted by the reference designation 400. In the event of an emergency maneuver situation, the longitudinal guidance control commands 33 are output at least to the one longitudinal guidance actuator 30 and the lateral guidance control commands 44 are output at least to the one lateral guidance actuator 40. This is denoted by the reference designation 500. The execution of the longitudinal guidance control commands 33 by way of at least the one longitudinal guidance actuator 30 and the execution of the lateral guidance control commands 44 by way of at least the one lateral guidance actuator 40 are denoted by reference designation 600.

What is claimed is:

1. An emergency maneuver control system for a vehicle, wherein the vehicle is operable at least in a driver-controlled operating mode and in a highly automated or autonomous operating mode and has at least one longitudinal guidance actuator and at least one lateral guidance actuator, the emergency maneuver control system comprising:
a path planning control device which is configured to, at least in the highly automated or autonomous operating mode of the vehicle, ascertain an emergency maneuver trajectory;
a longitudinal guidance actuator control device which is coupled to the path planning control device and which is configured to make available longitudinal guidance control commands derived from the emergency maneuver trajectory and, in an event of an emergency maneuver situation, cause the at least one longitudinal guidance actuator to execute the longitudinal guidance control commands; and
a lateral guidance actuator control device which is coupled to the path planning control device and which is configured to make available lateral guidance control commands derived from the emergency maneuver trajectory and, in the event of the emergency maneuver situation, cause the at least one lateral guidance actuator to execute the lateral guidance control commands,
wherein the highly automated or autonomous operating mode of the vehicle is controlled by a main channel comprising a first planning system, a first sensor arrangement system and a first execution system,
wherein the highly automated or autonomous operating mode of the vehicle is, in an event of a failure of the main channel, controlled by at least one redundancy channel comprising a second planning system, a second sensor arrangement system and a second execution system, and
wherein the event of the emergency maneuver situation is present if both the main channel and one or more of the at least one redundancy channel have failed.

2. The emergency maneuver control system according to claim 1,
wherein the longitudinal guidance actuator control device is further configured to, in the event of the emergency maneuver situation, cause the at least one longitudinal guidance actuator to execute the longitudinal guidance control commands independently of the lateral guidance control commands; and
wherein the lateral guidance actuator control device is further configured to, in the event of the emergency maneuver situation, cause the at least one lateral guidance actuator to execute the lateral guidance control commands independently of the longitudinal guidance control commands.

3. The emergency maneuver control system according to claim 1, wherein at least one of:
during execution of the longitudinal guidance control commands and of the lateral guidance control commands, no communication occurs between the longitudinal guidance actuator control device and the lateral guidance actuator control device, or
during the execution of the longitudinal guidance control commands and of the lateral guidance control commands, no communication occurs between the longitudinal guidance actuator and the lateral guidance actuator.

4. The emergency maneuver control system according to claim 1,
wherein the emergency maneuver trajectory is ascertained in a manner dependent on at least one of a present driving situation or a future driving situation of the vehicle.

5. The emergency maneuver control system according to claim 4,
wherein the at least one of the present driving situation or the future driving situation of the vehicle is defined by at least one of at least one longitudinal guidance parameter or at least one lateral guidance parameter.

6. The emergency maneuver control system according to claim 5, wherein at least one of:
the at least one longitudinal guidance parameter is selected from the following:
at least one of a present or a future friction coefficient of a roadway;
at least one of a present or a future ascending gradient of the roadway;

at least one of a present or a future descending gradient of the roadway;
a present vehicle mass;
at least one of a present or a future longitudinal speed of the vehicle, wherein the present longitudinal speed is ascertained by a longitudinal sensor unit; and
at least one of a present or a future change in a longitudinal speed of the vehicle, wherein the present change in the longitudinal speed is ascertained by the longitudinal sensor unit;
or
the at least one lateral guidance parameter is selected from the following:
at least one of a present or a future curvature of a traffic lane of a driving route of the vehicle;
at least one of a present or a future change in a curvature of the traffic lane of the driving route of the vehicle;
at least one of a present or future side forces acting on the vehicle;
at least one of a present or future lateral acceleration of the vehicle, wherein the present lateral acceleration is ascertained by a lateral sensor unit;
at least one of a present or a future change in lateral acceleration of the vehicle, wherein the present change in lateral acceleration is ascertained by the lateral sensor unit;
at least one of a present or a future steering angle of the vehicle; and
at least one of a present or a future change in a steering angle of the vehicle.

7. The emergency maneuver control system according to claim 1,
wherein the longitudinal guidance control commands comprise at least one setpoint longitudinal guidance parameter; and
wherein the lateral guidance control commands comprise at least one setpoint lateral guidance parameter.

8. The emergency maneuver control system according to claim 7,
wherein the at least one setpoint longitudinal guidance parameter is a function of a profile with respect to time.

9. The emergency maneuver control system according to claim 7,
wherein the at least one setpoint lateral guidance parameter is a function of a profile with respect to time.

10. The emergency maneuver control system according to claim 1,
wherein at least one of the path planning control device or the longitudinal guidance actuator control device is further configured to ascertain at least one of an emergency maneuver target speed or a maximum emergency maneuver duration of the emergency maneuver trajectory, and
wherein the longitudinal guidance actuator control device is further configured to, in the event of the emergency maneuver situation, cause the at least one longitudinal guidance actuator to execute the longitudinal guidance control commands until a present speed of the vehicle is lower than or equal to the emergency maneuver target speed or until a duration of the emergency maneuver has reached the maximum emergency maneuver duration.

11. The emergency maneuver control system according to claim 10, wherein at least one of the emergency maneuver target speed or the maximum emergency maneuver duration of the emergency maneuver trajectory is ascertained in a manner dependent on at least one of a respective present or future driving situation of the vehicle.

12. The emergency maneuver control system according to claim 10,
wherein the longitudinal guidance actuator control device is further configured to configure the longitudinal guidance control commands derived from the emergency maneuver trajectory such that a predetermined braking pattern can be executed.

13. The emergency maneuver control system according to claim 10,
wherein the present speed of the vehicle is ascertained by a sensor system and transmitted to the longitudinal guidance actuator control device, and
wherein the longitudinal guidance actuator control device is further configured to at least one of:
in the event of the emergency maneuver situation, cause the at least one longitudinal guidance actuator to execute the longitudinal guidance control commands until the duration of the emergency maneuver reaches the maximum emergency maneuver duration, or,
in the event that the present speed of the vehicle is ascertainable, in the event of the emergency maneuver situation, cause the at least one longitudinal guidance actuator to execute the longitudinal guidance control commands until the present speed of the vehicle is lower than or equal to the emergency maneuver target speed.

14. The emergency maneuver control system according to claim 1,
wherein the event of the emergency maneuver situation is present if at least two of the following failures are present:
failure of the first planning system of the main channel;
failure of the second planning system of a redundancy channel;
failure of the first sensor arrangement system of the main channel;
failure of the second sensor arrangement system of a redundancy channel;
failure of the first execution system of the main channel;
failure of the second execution system of a redundancy channel;
failure of a communication capability of the first planning system of the main channel;
failure of a communication capability of the second planning system of a redundancy channel;
failure of a communication capability of the first execution system of the main channel;
failure of a communication capability of the second execution system of a redundancy channel;
failure of a power supply of the vehicle; and
failure of a mechanical component of the vehicle.

15. A vehicle comprising the emergency maneuver control system according to claim 1.

16. An emergency maneuver control method for a vehicle, wherein the vehicle is operable at least in a driver-controlled operating mode and in a highly automated or autonomous operating mode and has at least one longitudinal guidance actuator and at least one lateral guidance actuator, wherein the emergency maneuver control method comprises:
ascertaining an emergency maneuver trajectory in the highly automated or autonomous operating mode of the vehicle;

deriving longitudinal guidance control commands and lateral guidance control commands from the ascertained emergency maneuver trajectory;

making available the longitudinal guidance control commands and the lateral guidance control commands; and in an event of an emergency maneuver situation, outputting the longitudinal guidance control commands at least to the one longitudinal guidance actuator and outputting the lateral guidance control commands at least to the one lateral guidance actuator, and executing the longitudinal guidance control commands by at least the one longitudinal guidance actuator and executing the lateral guidance control commands by at least the one lateral guidance actuator, wherein the highly automated or autonomous operating mode of the vehicle is controlled by a main channel comprising a first planning system, a first sensor arrangement system and a first execution system, wherein the highly automated or autonomous operating mode of the vehicle is, in an event of a failure of the main channel, controlled by at least one redundancy channel comprising a second planning system, a second sensor arrangement system and a second execution system, and wherein the event of the emergency maneuver situation is present if both the main channel and one or more of the at least one redundancy channel have failed.

17. The emergency maneuver control method according to claim 16, wherein the emergency maneuver control method further comprises:

in the event of the failure of the main channel, placing the at least one redundancy channel into a waiting condition for a predetermined waiting duration;

during the predetermined waiting duration, attempting to switch from the main channel to the at least one redundancy channel; and executing the longitudinal guidance control commands by at least the one longitudinal guidance actuator, and executing the lateral guidance control commands by at least the one lateral guidance actuator, if the predetermined waiting duration has expired and a switch from the main channel to the at least one redundancy channel has not occurred.

\* \* \* \* \*